(12) United States Patent
Adam et al.

(10) Patent No.: US 8,332,873 B2
(45) Date of Patent: Dec. 11, 2012

(54) DYNAMIC APPLICATION INSTANCE PLACEMENT IN DATA CENTER ENVIRONMENTS

(75) Inventors: Constantin M. Adam, New York, NY (US); Michael Joseph Spreitzer, Croton-on-Hudson, NY (US); Malgorzata Steinder, Leonia, NJ (US); Chunqiang Tang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 12/136,194

(22) Filed: Jun. 10, 2008

(65) Prior Publication Data

US 2008/0282267 A1 Nov. 13, 2008

Related U.S. Application Data

(63) Continuation of application No. 11/473,818, filed on Jun. 23, 2006, now abandoned.

(51) Int. Cl.
*G06F 3/00* (2006.01)
*G06F 9/44* (2006.01)
*G06F 9/46* (2006.01)
*G06F 13/00* (2006.01)

(52) U.S. Cl. .......... 719/320; 718/105
(58) Field of Classification Search ............ 719/320
See application file for complete search history.

(56) References Cited

U.S. PATENT DOCUMENTS

| | | | |
|---|---|---|---|
| 6,928,477 B1 | 8/2005 | Leymann et al. | |
| 7,941,556 B2 * | 5/2011 | Canali et al. ........... | 709/238 |
| 2002/0166117 A1 | 11/2002 | Abrams et al. | |
| 2003/0110242 A1 | 6/2003 | Brown et al. | |
| 2004/0111725 A1 | 6/2004 | Srinivasan et al. | |
| 2004/0267897 A1 | 12/2004 | Hill et al. | |
| 2005/0027843 A1 | 2/2005 | Bozak et al. | |
| 2005/0033844 A1 * | 2/2005 | Andrzejak et al. ........... | 709/226 |
| 2005/0188075 A1 | 8/2005 | Dias et al. | |
| 2006/0026599 A1 | 2/2006 | Herington et al. | |
| 2006/0190602 A1 | 8/2006 | Canali et al. | |
| 2007/0180083 A1 | 8/2007 | Adam et al. | |

OTHER PUBLICATIONS

Kimbrel et al, "Dynamic Application Placement Under Service and Memory Constraints", May 2005, Springer-Verlag, WEA 2005, LNCS 3503, pp. 391-402.*

C.M. Adam et al., "Scalable Self-Organizing Server Clusters with Quality of Service Objectives," Licentiate Thesis, TRITA-S3-LCN-0509, 2005, pp. 1-96.

C. Stewart et al., "Profile-Driven Component Placement for Cluster-Based Online Services," IEEE, Oct. 2004, pp. 1-6, vol. 5, Issue 10.

(Continued)

*Primary Examiner* — Emerson C. Puente
*Assistant Examiner* — Kimbleann Verdi
(74) *Attorney, Agent, or Firm* — Louis J. Percello; Ryan, Mason & Lewis, LLP

(57) ABSTRACT

A method for determining an application instance placement in a set of machines under one or more resource constraints includes the following steps. An estimate is computed of a value of the first metric that can be achieved by a current application instance placement and a current application load distribution. A new application instance placement and a new application load distribution are determined, wherein the new application instance placement and the new load distribution optimize the first metric.

12 Claims, 12 Drawing Sheets

OTHER PUBLICATIONS

Z. Li et al., "A Decentralized Agent Framework for Dynamic Composition and Coordination for Automatic Applications," SAACS, 2005, pp. 1-5.

A. Akkerman et al., "Infrastructure for Automatic Dynamic Deployment of J2EE Applications in Distributed Environments," CIMS Technical Report: TR2005-867, 2005, pp. 1-20.

K. Appleby et al., "Océano—SLA Based Management of a Computing Utility," Proceedings of the International Symposium on Integrated Network Management, May 2001, pp. 1-14.

J.M. Blanquer et al., "Quorum: Flexible Quality of Service for Internet Services," Second Symposium on Networked Systems Design and Implementation (NSDI'05), 2005, 16 pages.

S. Buchholz et al., "Replica Placement in Adaptive Content Distribution Networks," ACM Symposium on Applied Computing (SAC'04), Mar. 2004, pp. 1705-1710.

A. Chandra et al., "Quantifying the Benefits of Resource Multiplexing in On-Demand Data Centers," First Workshop on Algorithms and Architectures for Self-Managing Systems, Jun. 2003, 6 pages.

A. Fox et al., "Cluster-Based Scalable Network Services," Symposium on Operating Systems Principles, (SOSP), 1997, 14 pages.

G.C. Hunt et al., "The Coign Automatic Distributed Partitioning System," Proceedings of the 3rd Symposium on Operating System Design and Implementation (OSDI'99), Feb. 1999, pp. 1-14.

A. Karve et al., Dynamic Placement for Clustered Web Applications, World Wide Web Conference Committee (WWW2006), May 2006, 10 pages.

T. Kimbrel et al., "Dynamic Application Placement Under Service and Memory Constraints," International Workshop on Efficient and Experimental Algorithms, May 2005, pp . 1-10.

R. Levy et al., "Performance Management for Cluster Based Web Services," Proceedings of the International Symposium on Integrated Network Management, Mar. 2003, pp. 247-261.

G. Pacifici et al., "Managing the Response Time for Multi-Tiered Web Applications," IBM Research Report, Computer Science, Technical Report RC 23651, Jul. 2005, pp. 1-16.

H. Shachnai et al., "Noah's Bagels—Some Combinatorial Aspects," Proceedings of the 1st International Conference on Fun with Algorithms, 1998, pp. 1-18.

H. Shachnai et al., "On Two Class-Constrained Versions of the Multiple Knapsack Problem," Algorithmica, 2001, pp. 1-28, vol. 29, No. 3.

K. Shen et al., "Integrated Resources Management for Cluster-Based Internet Services," Proceedings of the 5th Symposium on Operating Systems Design and Implementation, (OSDI'02), Dec. 2002, 14 pages.

B. Urgaonkar et al., "Resource Overbooking and Application Profiling in Shared Hosting Platforms," Proceedings of the 5th Symposium on Operating Systems Design and Implementation, (OSDI'02), Dec. 2002, pp. 1-15.

* cited by examiner

| | |
|---|---|
| N | THE SET OF MACHINES. |
| n | ONE MACHINE IN THE SET N. |
| M | THE SET OF APPLICATIONS. |
| m | ONE APPLICATION IN THE SET M. |
| R | THE PLACEMENT RESTRICTION MATRIX. $R_{m,n} = 1$ IF APPLICATION m CAN RUN ON MACHINE n; OTHERWISE, $R_{m,n} = 0$. |
| I | THE PLACEMENT MATRIX. $I_{m,n} = 1$ IF APPLICATION m IS RUNNING ON MACHINE n; OTHERWISE, $I_{m,n} = 0$. |
| L | THE LOAD DISTRIBUTION MATRIX. $L_{m,n}$ IS THE CPU CYCLES PER SECOND (HYPOTHETICALLY) ALLOCATED ON MACHINE n FOR APPLICATION m. L IS AN OUTPUT OF THE PLACEMENT ALGORITHM; IT IS NOT MEASURED FROM THE RUNNING SYSTEM. |
| $\Gamma_n$ | THE MEMORY CAPACITY OF MACHINE n. |
| $\Omega_n$ | THE CPU CAPACITY OF MACHINE n. |
| $\gamma_m$ | THE MEMORY DEMAND OF APPLICATION m, i.e., THE MEMORY NEEDED TO RUN ONE INSTANCE OF APPLICATION m. |
| $\omega_m$ | THE CPU DEMAND OF APPLICATION m, i.e., THE TOTAL CPU CYCLES PER SECOND NEEDED FOR APPLICATION m THROUGHOUT THE ENTIRE SYSTEM. |
| $\omega^*_m$ | THE RESIDUAL CPU DEMAND OF APPLICATION m, i.e., THE DEMAND NOT SATISFIED BY THE LOAD DISTRIBUTION MATRIX L, $\omega^*_m = \omega_m - \Sigma_{n \in N} L_{m,n}$. |
| $\Omega^*_n$ | THE RESIDUAL CPU CAPACITY OF MACHINE n, i.e., THE CPU CAPACITY NOT CONSUMED BY THE APPLICATIONS RUNNING ON MACHINE n, $\Omega^*_n = \Omega_n - \Sigma_{m \in M} L_{m,n}$. |
| $\Gamma^*_n$ | THE RESIDUAL MEMORY CAPACITY OF MACHINE n, i.e., THE MEMORY CAPACITY NOT CONSUMED BY THE BUSY APPLICATIONS ( $L_{m,n} > 0$ ) RUNNING ON MACHINE n, $\Gamma^*_n = \Gamma_n - \Sigma_{m:L_{m,n}>0} \gamma_m$. |

FIG. 3

```
FUNCTION PLACE ( )
{
 FOR (i = 0; i < K; i++) {  // K = 10 BY DEFAULT.
   CALC_MAX_DEMAND_SATISFIED_BY_CURRENT_PLACEMENT ( );
   IF (ALL DEMANDS SATISFIED) BREAK_OUT_OF_THE_LOOP;

LOAD_SHIFTING ( );   // NO PLACEMENT CHANGES HERE.

PLACEMENT_CHANGING (PIN_APP = FALSE);
   PLACEMENT_CHANGING (PIN_APP = TRUE);

CHOOSE_THE_BETTER_ONE_AS_THE_SOLUTION; // PIN OR NOT.
   IF (NO_IMPROVEMENT) BREAK_OUT_OF_THE_LOOP;
 }

BALANCE_LOAD_ACROSS_MACHINES ( );
}
```

```
FUNCTION PLACEMENT_CHANGING (BOOLEAN PIN_APP)
{
 // ------------------------------------------------------------------OUTERMOST LOOP-----
 // CHANGE THE PLACEMENT ON ONE MACHINE AT A TIME.
 FOR (ALL UNDERUTILIZED MACHINES n) {

IF (PIN_APP==TRUE) IDENTIFY_PINNED_APP_INSTANCES( );
   // SUPPOSE MACHINE n CURRENTLY RUNS c NOT-PINNED
   // APP INSTANCES (M1, M2, ..., Mc) SORTED IN
   // INCREASING ORDER OF LOAD-MEMORY RATIO.

// -----------------------------------------------------------------INTERMEDIATE LOOP-----
   FOR (j=0; j < c; j++) {
    IF(j > 0) STOP_j_APPS_ON_MACHINE_n (M1, M2, ..., Mj);

//------------------------------------------------------------------INNERMOST LOOP-----
    // FIND APPS TO CONSUME n'S RESIDUAL RESOURCES THAT
    // BECOME AVAILABLE AFTER STOPPING THE j APPS.
    FOR (ALL APPS x WITH A POSITIVE RESIDUAL DEMAND) {
     IF (APP_x_FITS_ON_MACHINE_n) START_x_ON_n ( );
    }

IF (IS_THE_BEST_SOLUTION_FOR_MACHINE_n_SO_FAR) RECORD_IT( );
 }}}
```

FIG. 4

```
FUNCTION PLACE ( )
{
  // REPEAT THE ALGORITHM FOR K = 10 ROUNDS SO LONG AS THE TOTAL SATISFIED DEMAND KEEPS IMPROVING.
  FOR (ROUND = 0; ROUND < K; ROUND ++) {
    LOAD_SHIFTING ();   // SEE FIG. 8 FOR THIS SUBROUTINE.

IF (ALL THE APPLICATION DEMANDS HAVE BEEN SATISFIED) GOTO DONE;

// THE FIRST ROUND IS SPECIAL AS IT TRIES TO PIN SOME APPLICATION INSTANCES.
    // THE FIRST ROUND HAS TWO "PASSES", WITH AND WITHOUT PINNING, RESPECTIVELY.
    IF (ROUND == 0) {
      MAKE A COPY OF THE OUTPUTS OF LOAD_SHIFTING () FOR LATER REUSE IN PASS 2;

// PASS 1. THIS PASS DOES NOT PIN ANY APPLICATION INSTANCES.
      PLACEMENT_CHANGING (PIN_APP = FALSE);   // SEE FIG. 7A AND FIG. 7B FOR THIS SUBROUTINE.

RECORD THE TOTAL SATISFIED DEMAND AND THE CORRESPONDING PLACEMENT SOLUTION;

LET Y DENOTE THE LARGEST RESIDUAL DEMAND OF THE RESIDUAL APPLICATIONS NOT SATISFIED
      AFTER THE FIRST INVOCATION OF PLACEMENT_CHANGING ().

// COMPUTE THE PINNING THRESHOLD FOR EACH APPLICATION. THIS THRESHOLD WILL BE
      // USED BY THE SECOND INVOCATION TO PLACEMENT_CHANGING () IN PASS 2 TO PIN SOME
      // APPLICATION INSTANCES. THE GOAL IS TO REDUCE UNNECESSARY PLACEMENT CHANGES.
      FOR (ALL APPLICATIONS m) {
        AMONG THE NEW INSTANCES OF APPLICATION m STARTED IN PASS 1, LET MIN_NEW_INSTANCE_LOAD_FOR_APP_m
        DENOTE THE MINIMUM LOAD ASSIGNED TO A NEW INSTANCE OF APP_m. IF NO NEW INSTANCE OF APP m
        IS STARTED IN PASS 1, SET MIN_NEW_INSTANCE_LOAD_FOR_APP_m TO A MAXIMUM NUMBER (e.g, INT_MAX).

PIN_THRESHOLD_FOR_APP_m = MAX (1, MIN (Y, MIN_NEW_INSTANCE_LOAD_FOR_APP_m));
        // PASS 2 WILL PIN INSTANCES OF m THAT HAVE A LOAD HIGHER THAN OR EQUAL TO PIN_THRESHOLD_FOR_APP_m.
```

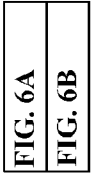

FIG. 6A

RESTORE THE SAVED OUTPUTS OF LOAD_SHIFTING ( ) AND USE THEM TO PREPARE THE INPUTS FOR PASS 2.

// PASS 2. THIS PASS TRIES TO PIN SOME APPLICATION INSTANCES.
PLACEMENT_CHANGING (PIN_APP = TRUE);

IF (TOTAL_SATISFIED_DEMAND_IN_PASS_1 == TOTAL_SATISFIED_DEMAND_IN_PASS_2) {
  USE THE PLACEMENT SOLUTION WITH LESS PLACEMENT CHANGES.
}
ELSE IF (TOTAL_SATISFIED_DEMAND_IN_PASS_1 < TOTAL_SATISFIED_DEMAND_IN_PASS_2) {
  USE THE PLACEMENT SOLUTION FROM PASS 2;
}
ELSE {
  USE THE PLACEMENT SOLUTION FROM PASS 1;
}
} // END: IF (ROUND = 0)
ELSE {
  // MOST PLACEMENT CHANGES HAPPEN IN ROUND 0. FOR ROUND > 0, IT ONLY MAKES ONE
  // INVOCATION TO PLACEMENT_CHANGING ( ) TO REDUCE COMPUTATION TIME.
  PLACEMENT_CHANGING (PIN_APP = FALSE);
}

IF (THE TOTAL SATISFIED DEMAND DOES NOT INCREASE IN THIS ROUND) {
  GOTO DONE;  // QUIT PREMATURELY BEFORE THE 10-ROUND LIMIT IS REACHED.
}
} // END: FOR (ROUND = 0; ROUND < 10; ROUND ++)

DONE:
BALANCE THE LOAD ACROSS MACHINES BY SOLVING A MIN-COST MAX-FLOW PROBLEM AND MOVING THE
NEW APPLICATION INSTANCES BETWEEN MACHINES. SEE THE WWW'06 PAPER BY KARVE ET AL.
}

```
FUNCTION PLACEMENT_CHANGING (BOOLEAN PIN_APP)
{
  IDENTIFY AND EXCLUDE FULLY UTILIZED MACHINES FROM THE CONSIDERATION OF PLACEMENT CHANGE.

COMPUTE THE RESIDUAL CPU DEMAND OF EACH APPLICATION AND KEEP TRACK OF THE MINIMUM MEMORY REQUIREMENT
  OF THE APPLICATIONS WITH A POSITIVE RESIDUAL CPU DEMAND (MIN_MEM_DEMAND_OF_RESIDUAL_APPS).

SORT THE UNDERUTILIZED MACHINES IN DECREASING ORDER OF CPU-MEMORY RATIO; THE LOOP BELOW STARTS
  FROM THE ONE WITH THE HIGHEST CPU-MEMORY RATIO.
  FOR (ALL UNDERUTILIZED MACHINES n) {                              // OUTERMOST LOOP
    IF (NO APPLICATION HAS RESIDUAL DEMAND) RETURN;

// INCREASE THE LOAD OF THE APPLICATION INSTANCES ALREADY RUNNING ON MACHINE n.
    FOR (ALL APPLICATIONS m RUNNING ON MACHINE n) {
      IF (APPLICATION m HAS A POSITIVE RESIDUAL DEMAND) {
        ASSIGN MORE LOAD TO THIS INSTANCE UNTIL EITHER MACHINE n'S CPU IS FULLY
          UTILIZED OR APPLICATION m HAS NO RESIDUAL DEMAND;
      }
    }
    IF (MACHINE n BECOMES FULLY UTILIZED) {
      NO FURTHER CHANGES TO MACHINE n ARE NEEDED; CONTINUE TO THE NEXT MACHINE;
    }

IF (PIN_APP == TRUE) {   // THIS IS THE SECOND INVOCATION IN PASS 2 WITH PINNING REQUESTS.
      IDENTIFY PINNED APPLICATION INSTANCES ON MACHINE n, WHICH ARE NOT ALLOWED TO BE STOPPED IN THIS ROUND.
      AN INSTANCE OF APPLICATION m IS PINNED ON MACHINE n IF (LOAD FOR THIS INSTANCE L_{m,n} >= PIN_THRESHOLD_FOR_APP_m),
      WHERE PIN_THRESHOLD_FOR_APP_m IS PROVIDED BY THE CALLER OF THIS SUBROUTINE;
    }

SORT NOT-PINNED APPLICATION INSTANCES ON MACHINE n IN INCREASING ORDER OF LOAD-MEMORY RATIO.
    LET (M1, M2, ..., Mc) DENOTE THESE INSTANCES, WHERE M0 HAS THE LOWEST LOAD-MEMORY RATIO;
```

```
// FREE ONE MORE INSTANCE AT A TIME, AND USE THE RESIDUAL RESOURCES TO HOST RESIDUAL APPLICATIONS.
FOR (j = 1; j <= c; j++) {                                                   // INTERMEDIATE LOOP
    KEEP THE "HIGH-VALUE" INSTANCES Mj,...,Mc ON MACHINE n, AND STOP ALL THE OTHER INSTANCES ON n,
    INCLUDING M1,...,Mj-1 AND THOSE NEWLY STARTED ON n IN THIS SUBROUTINE. THE RESIDUAL
    RESOURCES ON MACHINE n AND THE RESIDUAL APPLICATION DEMANDS ARE UPDATED ACCORDINGLY.

// THE RESIDUAL APPLICATIONS ARE SORTED IN DECREASING ORDER OF RESIDUAL DEMAND.
    // THIS "FOR LOOP" STARTS FROM THE APPLICATION WITH THE LARGEST RESIDUAL DEMAND.
    FOR (ALL APPLICATIONS m THAT HAVE A POSITIVE RESIDUAL DEMAND) {          // INNERMOST LOOP
        IF (Rm,n == TRUE /* APPLICATION m CAN RUN ON MACHINE n */
            && APP_m_CAN_FIT_IN_MACHINE_n'S RESIDUAL_MEMORY) {
            ACCEPT APPLICATION m ON MACHINE n, AND ASSIGN AS MUCH LOAD AS POSSIBLE TO THIS INSTANCE UNTIL
            EITHER MACHINE n HAS NO RESIDUAL CPU CAPACITY OR APPLICATION m HAS NO RESIDUAL DEMANDS;

IF (MACHINE_n_HAS_NO_RESIDUAL_CPU || n'S RESIDUAL_MEM < MIN_MEM_DEMAND_OF_RESIDUAL_APPS /*TRACKED*/) {
            GOTO FREE_THIS_INST_DONE;                   // MACHINE n CANNOT FIT MORE RESIDUAL APPLICATIONS.
        }
    } // END: FOR (ALL APPLICATIONS m...)

FREE_THIS_INST_DONE:
    IF (THIS NEW SOLUTION ALLOWS MACHINE n TO SATISFY THE HIGHEST DEMAND SO FAR) {
        RECORD THIS SOLUTION AS THE BEST_SOLUTION_FOR_THE_MACHINE_N_SO_FAR;
    }
} // END: FOR (j...)

USE THE BEST_SOLUTION_FOR_MACHINE_n_SO_FAR AS THE FINAL SOLUTION FOR
MACHINE n, AND ADJUST THE RESIDUAL APPLICATION DEMANDS ACCORDINGLY;
} // END: FOR (ALL UNDERUTILIZED MACHINES n)
```

FIG. 7B

```
FUNCTION LOAD_SHIFTING ( )
{
 1. CHECK IF THE CURRENT PLACEMENT MATRIX CAN SATISFY ALL THE
    CURRENT APPLICATION DEMANDS BY SOLVING A MAX-FLOW PROBLEM. IF
    SO, RETURN IMMEDIATELY.

2. SHIFT LOAD AMONG MACHINES (WITHOUT ANY PLACEMENT CHANGES) IN
    PREPARATION FOR SUBSEQUENT PLACEMENT CHANGES.
       (A) SORT MACHINES IN INCREASING ORDER OF RESIDUAL MEMORY.
       (B) MOVE LOAD AWAY FROM THE MACHINES WITH RELATIVELY LARGE
           RESIDUAL MEMORY BY SOLVING A MIN-COST MAX-FLOW PROBLEM.
           THE GOAL IS TO CO-LOCATE RESIDUAL MEMORY AND RESIDUAL
           CPU ON THE SAME MACHINES, AND TO REDUCE THE NUMBER OF
           UNDERUTILIZED APPLICATION INSTANCES.
}
```

FIG. 8

DYNAMIC APPLICATION INSTANCE PLACEMENT IN DATA CENTER ENVIRONMENTS

CROSS REFERENCE TO RELATED APPLICATIONS

This application is a continuation of pending U.S. application Ser. No. 11/473,818 filed on Jun. 23, 2006, now abandoned, the disclosure of which is incorporated herein by reference.

FIELD OF THE INVENTION

The present invention generally relates to computing systems and, more particularly, to techniques for determining placements of application instances on computing resources in a computing system such that the application instances can be executed thereon.

BACKGROUND OF THE INVENTION

With the rapid growth of the Internet, many organizations increasingly rely on web (i.e., World Wide Web) applications to deliver critical services to their customers and partners. An "application" generally refers to software code (e.g., one or more programs) which perform one or more functions.

Over the course of a decade, web applications have evolved from the early HyperText Transport Protocol (HTTP) servers that only deliver static HyperText Markup Language (HTML) files, to the current ones that run in sophisticated distributed environments, e.g., Java 2 Enterprise Edition (J2EE), and provide a diversity of services such as online shopping, online banking, and web search. Modern Internet data centers may run thousands of machines to host a large number of different web applications. Many web applications are resource demanding and process client requests at a high rate. Previous studies have shown that the web request rate is bursty in nature and can fluctuate dramatically in a short period of time. Therefore, it is not cost-effective to over provision data centers in order to handle the potential peak demands of all the applications.

To utilize system resources more effectively, modern web applications typically run on top of a middleware system and rely on it to dynamically allocate resources to meet the applications' performance goals. "Middleware" generally refers to the software layer that lies between the operating system and the applications. Some middleware systems use a clustering technology to improve scalability, availability and load balancing, by integrating multiple instances of the same application, and presenting them to the users as a single virtual application.

SUMMARY OF THE INVENTION

Principles of the invention provide techniques for determining placements of application instances on computing resources in a computing system such that the application instances can be executed thereon.

By way of example, in one aspect of the invention, a method for determining an application instance placement in a set of machines under one or more resource constraints includes the following steps. An estimate is computed of a value of the first metric that can be achieved by a current application instance placement and a current application load distribution. A new application instance placement and a new application load distribution are determined, wherein the new application instance placement and the new application load distribution optimize the first metric.

The determining step may further include the new application instance placement improving upon the first metric and the new load distribution improving upon a second metric. The determining step may further include shifting an application load, changing the application instance placement without pinning to determine a first candidate placement, changing the application instance placement with pinning to determine a second candidate placement, and selecting a best placement from the first candidate placement and the second candidate placement as the new application instance placement. The determining step may be performed multiple times.

The method may also include the step of balancing an application load across the set of machines.

The first metric may include a total number of satisfied demands, a total number of placement changes, or an extent to which an application load is balanced across the set of machines.

One of the one or more resource constraints may include a processing capacity or a memory capacity.

The second metric may include a degree of correlation between residual resources on each machine of the set of machines, or a number of underutilized application instances.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 illustrates symbols used in a description of an application placement problem, according to an embodiment of the invention.

FIG. 4 illustrates a high-level pseudo code implementation of an application placement algorithm, according to an embodiment of the invention.

FIGS. 6A and 6B illustrate a pseudo code implementation of an application placement algorithm, according to an embodiment of the invention.

FIGS. 7A and 7B illustrate a pseudo code implementation of placement changing function, according to an embodiment of the invention.

FIG. 8 illustrates a pseudo code implementation of load shifting function, according to an embodiment of the invention.

DETAILED DESCRIPTION OF PREFERRED EMBODIMENTS

Illustrative principles of the invention will be explained below in the context of an Internet-based/web application environment. However, it is to be understood that the present invention is not limited to such an environment. Rather, the invention is more generally applicable to any data processing environment in which it would be desirable to provide improved processing performance.

In the illustrative description below, the following problem is addressed. Given a set of machines (computing systems or servers) and a set of web applications with dynamically changing demands (e.g., the number of client requests for use of the application), an application placement controller decides how many instances to run for each application and where to put them (i.e., which machines to assign them to), while observing a variety of resource constraints. "Instances" of an application generally refer to identical copies of the application, but can also refer to different or even overlapping parts of the application. This problem is considered non-deterministic polynomial-time (NP) hard. Illustrative principles of the invention propose an online algorithm that uses heuristics to efficiently solve this problem. The algorithm allows multiple applications to share a single machine, and strives to maximize the total satisfied application demand, to minimize the number of application starts and stops, and to balance the load across machines. It is to be understood that reasonable extensions of the proposed algorithm can also optimize for other performance goals, for example, maximize or minimize certain user specified utility functions.

Figure 1:
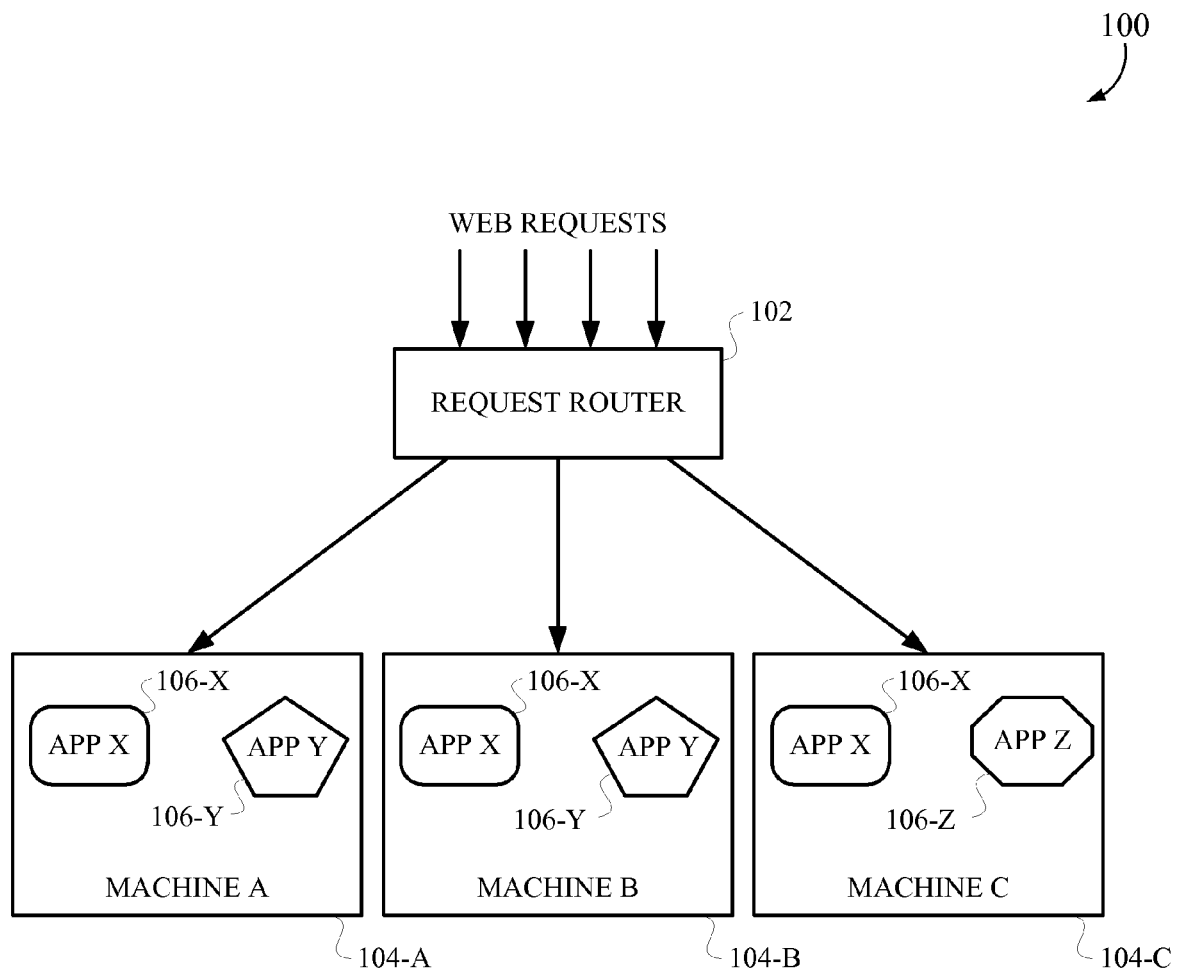
FIG. 1 illustrates an example of clustered web applications, according to an embodiment of the invention.

FIG. 1 is an example of clustered web applications. System 100 includes one front-end request router 102, three back-end computing nodes 104 (A, B, and C), and three applications 106 (x, y, and z). The applications, for example, can be a catalog search application, an order processing application, and an account management application, for an online shopping site. Request router 102 receives external requests (from client devices, not shown) and forwards them to the appropriate instances of the three applications (106-$x$, 106-$y$, and 106-$z$). To achieve the quality of service (QoS) goals of the applications, the request router may implement functions such as admission control, flow control, and load balancing.

Flow control and load balancing decide how to dynamically allocate resources to the running application instances. Illustrative principles of the invention address an equally important problem. That is, given a set of machines with constrained resources and a set of web applications with dynamically changing demands, we determine how many instances to run for each application and what machine to execute them on.

We call this problem dynamic application placement. We assume that not every machine can run all the applications at the same time due to limited resources such as memory.

Application placement is orthogonal to flow control and load balancing, and the quality of a placement solution can have profound impacts on the performance of the entire system (i.e., the complete set of machines used for hosting applications). In FIG. 1, suppose the request rate for application z suddenly surges. Application z may not meet the demands even if all the resources of machine C are allocated to application z. A middleware system then may react by stopping application x on machines A and B, and using the freed resources (e.g., memory) to start an instance of application z on both A and B.

We illustratively formulate the application placement problem as a variant of the Class Constrained Multiple-Knapsack Problem (see, e.g., H. Shachnai and T. Tamir, "Noah's bagels—some combinatorial aspects," In Proc. 1st Int. Conf. on Fun with Algorithms, 1998; and H. Shachnai and T. Tamir, "On two class-constrained versions of the multiple knapsack problem," Algorithmica, 29(3), pp. 442-467, 2001). Under multiple resource constraints (e.g., CPU and memory) and application constraints (e.g., the need for special hardware or software), an automated placement algorithm strives to produce placement solutions that optimize multiple objectives: (1) maximizing the total satisfied application demand, (2) minimizing the total number of application starts and stops, and (3) balancing the load across machines. It is to be understood that we can also optimize for other objective functions, for example, a user specified utility function.

The placement problem is NP hard. In one embodiment, the invention provides an online heuristic algorithm that can produce within 30 seconds high-quality solutions for hard placement problems with thousands of machines and thousands of application. This scalability is crucial for dynamic resource provisioning in large-scale enterprise data centers. Compared with existing algorithms, for systems with 100 machines or less, the proposed algorithm is up to 134 times faster, reduces the number of application starts and stops by up to a factor of 32, and satisfies up to 25% more application demands.

The remainder of the detailed description is organized as follows. Section I formulates the application placement problem. Section II describes an illustrative placement algorithm.

I. Problem Formulation

Figure 2:
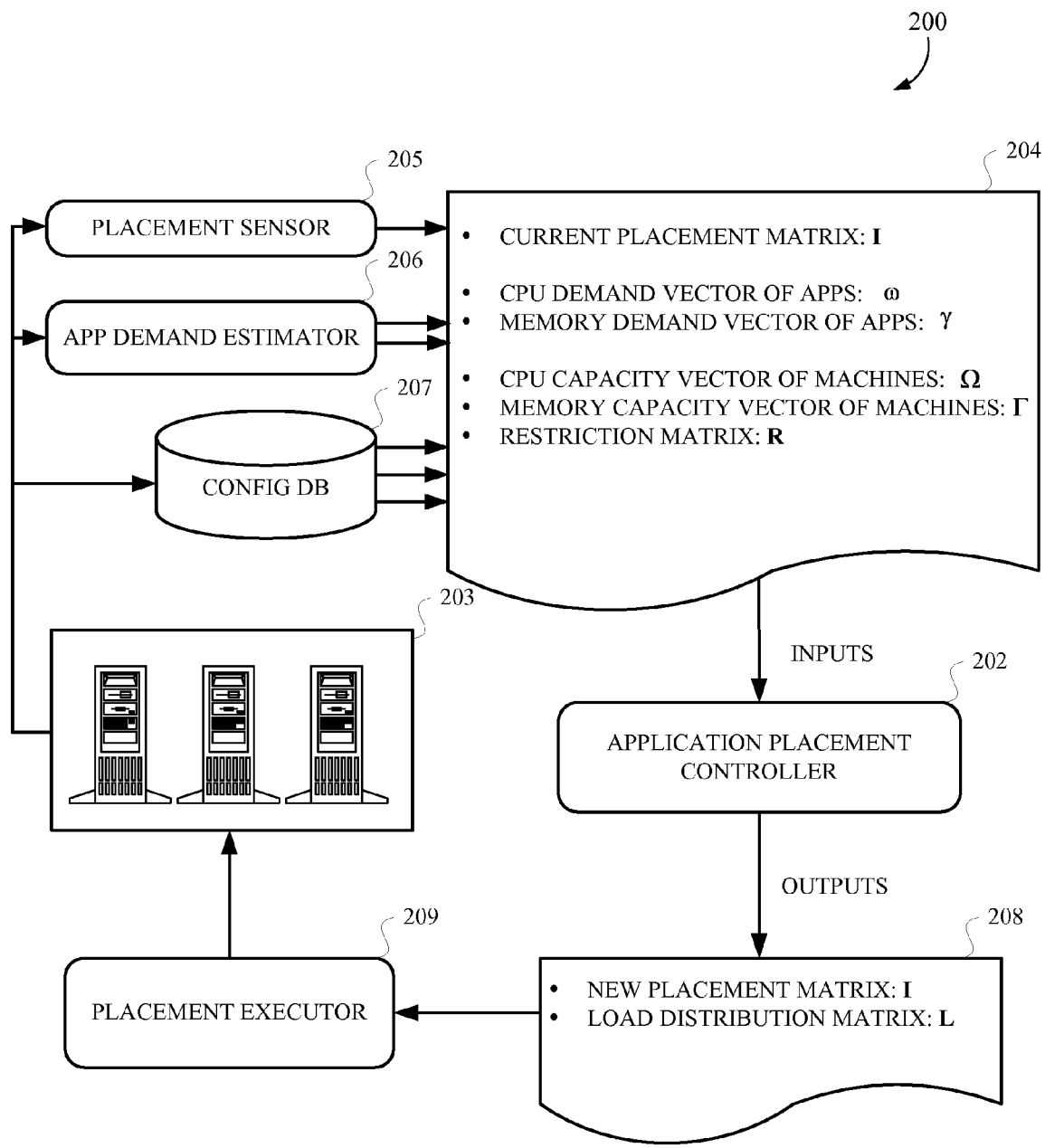
FIG. 2 illustrates a control loop and system for solving an application placement problem, according to an embodiment of the invention.

FIG. 2 is a diagram of a control loop and system 200 for solving the application placement problem. For brevity, we simply refer to "application placement" as "placement" in the following illustrative description. Placement controller 202 is the main placement processing component of the control loop. The set of machines (data center) 203 includes the machines for which placement controller 202 determines application placement.

Inputs 204 to placement controller 202 include the current placement of applications on machines (matrix I), the resource capacity of each machine (CPU capacity vector $\Omega$ and memory capacity vector $\Gamma$), the projected resource demand of each application (CPU demand vector $\omega$ and memory demand vector $\gamma$), and the restrictions that specify whether a given application can run on a given machine (matrix R), e.g., some application may require machines with special hardware or software. It is to be appreciated that such inputs are collected by auxiliary components. That is, placement sensor 205 generates and maintains current placement matrix I. Application demand estimator 206 generates and maintains the projected resource demand of each application (CPU demand vector $\omega$ and memory demand vector $\gamma$). Configuration database 207 maintains the resource capacity of each machine (CPU capacity vector $\Omega$ and memory capacity vector $\Gamma$).

Taking inputs 204, placement controller 202 generates outputs 208 including new placement matrix I and load distribution matrix L. That is, placement controller 202 computes a new placement solution (new matrix I) that optimizes certain objective functions, and then passes the solution to placement executor 209 to start and stop application instances accordingly. The placement executor schedules placement changes in such a way that they impose minimum disturbances to the running system. Periodically every T minutes, the placement controller produces a new placement solution based on the current inputs. By way of example only, T=15 minutes may be a default configuration.

Estimating application demands is a non-trivial task. In one embodiment, we use online profiling and linear regression to dynamically estimate the average CPU cycles needed to process one web request for a given application. The product of the estimated CPU cycles per request and the projected request rate gives the CPU cycles needed by the application per second. However, it is to be understood that other known techniques for estimating application demand may be used.

The remainder of this section presents the formal formulation of the illustrative placement problem. We first discuss the system resources and application demands considered in the placement problem. An application's demands for resources can be characterized as either load-dependent or load-independent. A running application instance's consumption of load-dependent resources depends on the request rate. Examples of such resources include CPU cycles and network bandwidth. A running application instance also consumes some load-independent resources regardless of the offered load, i.e., even if it processes no requests. An example of such resources is the process control block (PCB) maintained in the operating system kernel for each running program.

In this embodiment, for practical reasons, we treat memory as a load-independent resource, and conservatively estimate the memory usage to ensure that every running application has sufficient memory. It is assumed that the system includes a component that dynamically estimates the upper limit of an application's near-term memory usage based on a time series of its past memory usage. Because the memory usage estimation is updated dynamically, some load-dependent aspects of memory are indirectly considered by the placement controller.

We treat memory as a load-independent resource for several reasons. First, a significant amount of memory is consumed by an application instance even if it receives no requests. Second, memory consumption is often related to prior application usage rather than its current load. For example, even in the presence of a low load, memory usage may still be high as a result of data caching. Third, because an accurate projection of future memory usage is extremely difficult and many applications cannot run when the system is out of memory, it is more reasonable to be conservative in the estimation of memory usage, i.e., using the upper limit instead of the average.

Among many load-dependent and load-independent resources, we choose CPU and memory as the representative ones to be considered by the placement controller, because we observe that they are the most common bottleneck resources. For example, our experience shows that many business J2EE applications require on average 1-2 GB (gigabyte) real memory to run. For brevity, the description of the algorithm only considers CPU and memory, but it is to be understood that the algorithm can consider other types of resources as well. For example, if the system is network-bounded, we can use network bandwidth as the load-dependent resource, which introduces no changes to the algorithm.

Next, we present the formal formulation of the placement problem. FIG. 3 lists the symbols used in the description. The inputs to the placement controller are the current placement matrix I, the placement restriction matrix R, the CPU and memory capacity of each machine ($\Omega_n$ and $\Gamma_n$), the CPU and memory demand of each application ($\omega_m$, and $\gamma_m$). Note that $\omega_m$ is application m's aggregated CPU demand throughout the entire system (i.e., the complete set of machines used for hosting applications), while $\gamma_m$ is the memory requirement to run one instance of application m. Due to special hardware or software requirements, an application m may not be able to run on a machine n. This placement restriction is represented as $R_{m,n}=0$.

The outputs 208 of placement controller 202 are the updated placement matrix I and the load distribution matrix L. Placement executor 209 starts and stops application instances according to the difference between the old and new placement matrices. The load distribution matrix L is a byproduct. It helps verify the maximum total application demand that can be satisfied by the new placement matrix I. L may or may not be directly used by the placement executor or the request router. The request router may dynamically balance the load according to the real received demands rather than the load distribution matrix L computed based on the projected demands.

Placement controller 202 strives to find a placement solution that maximizes the total satisfied application demand. Again, it is to be understood that this is just one example of the optimization goal. That is, principles of the invention may also be used to optimize for other objective functions instead of maximizing the total satisfied demand, for example, maximize certain user-specified utility function. In addition, the placement controller also tries to minimize the total number of application starts and stops, because placement changes disturb the running system and waste CPU cycles. In practice, many J2EE applications take a few minutes to start or stop, and take some additional time to warm up their data cache. The last optimization goal is to balance the load across machines. Ideally, the utilization of individual machines should stay close to the utilization p of the entire system:

$$\rho = \frac{\sum_{m \in M} \sum_{n \in N} L_{m,n}}{\sum_{n \in N} \Omega_n} \quad (1)$$

As we are dealing with multiple optimization objectives, we prioritize them in the formal problem statement below. Let I* denote the old placement matrix, and I denote the new placement matrix:

$$\text{(i) maximize} \sum_{m \in M} \sum_{n \in N} L_{m,n} \quad (2)$$

$$\text{(ii) minimize} \sum_{m \in M} \sum_{n \in N} |I_{m,n} - I^*_{m,n}| \quad (3)$$

$$\text{(iii) minimize} \sum_{n \in N} \left| \frac{\sum_{m \in M} L_{m,n}}{\Omega_n} - \rho \right| \quad (4)$$

such that $$\forall m \in M, \forall n \in N \; I_{m,n}=0 \text{ or } I_{m,n}=1 \quad (5)$$

$$\forall m \in M, \forall n \in N \; R_{m,n}=0 \Rightarrow I_{m,n}=0 \quad (6)$$

$$\forall m \in M, \forall n \in N \; I_{m,n}=0 \Rightarrow L_{m,n}=0 \quad (7)$$

$$\forall m \in M, \forall n \in N \; L_{m,n} \geq 0 \quad (8)$$

$$\forall n \in N \; \sum_{m \in M} \gamma_m I_{m,n} \leq \Gamma_n \quad (9)$$

$$\forall n \in N \; \sum_{m \in M} L_{m,n} \leq \Omega_n \quad (10)$$

$$\forall n \in M \; \sum_{n \in N} L_{m,n} \leq w_m \quad (11)$$

As mentioned above, this optimization problem is a variant of the Class Constrained Multiple-Knapsack problem. It differs from the prior formulation mainly in that it also minimizes the number of placement changes. This problem is NP hard. In the next section, we present an online heuristic algorithm for solving the optimization problem.

II. Placement Algorithm

This section describes an illustrative embodiment of a placement algorithm, which can efficiently find high-quality placement solutions even under tight resource constraints. FIG. 4 shows a high-level pseudo code implementation of a placement algorithm according to an embodiment of the invention. A more complete version is illustrated in FIGS. 6, 7 and 8.

The core of the place( ) function is a loop that incrementally optimizes the placement solution. Inside the loop, the algorithm first solves the max-flow problem (see, e.g., R. K. Ahuja, T. L. Magnanti, and J. B. Orlin, editors, "Network Flows: Theory, Algorithms, and Applications," Prentice Hall, New Jersey, 1993, ISBN 1000499012) in FIG. 5 to compute the maximum total demand that can be satisfied by the current placement matrix. The algorithm then invokes the load_shifting( ) subroutine to move load among machines (without any placement changes) in preparation for subsequent placement changes. Finally, the algorithm invokes the placement_changing( ) subroutine to start or stop application instances in order to increase the total satisfied application demand. Note that "placement change" and "load shifting" in the algorithm description are all hypothetical. The real placement changes are executed after the placement algorithm finishes. The outputs of the placement algorithm are the updated placement matrix I and the new load distribution matrix L. The load_shifting( ) subroutine modifies only L whereas the placement_changing( ) subroutine modifies both I and L.

Below, we first define some terms that will be used in the algorithm description (subsection A), and then generally describe key concepts of the algorithm (subsections B and C). Finally, we describe in detail the load-shifting subroutine (subsection D), the placement-changing subroutine (subsection E), and the full placement algorithm (subsection F) that invokes the two subroutines.

A. Definition of Terms

A machine is fully utilized if its residual CPU capacity is zero ($\Omega^*_n = 0$); otherwise, it is underutilized. An application instance is fully utilized if it runs on a fully utilized machine. An instance of application m running on an underutilized machine n is completely idle if it has no load ($L_{m,n}=0$); otherwise, it is underutilized. The load of an underutilized instance of application m can be increased if application m has a positive residual CPU demand ($\omega^*_m > 0$). Note that the definition of a machine's utilization is solely based on its CPU usage.

The CPU-memory ratio of a machine n is defined as its CPU capacity divided by its memory capacity, i.e., $\Omega_n/\Gamma_n$. Intuitively, it is harder to fully utilize the CPU of machines with a high CPU-memory ratio. The load-memory ratio of an instance of application m running on machine n is defined as the CPU load of this instance divided by its memory consumption, i.e., $L_{m,n}/\gamma_m$. Intuitively, application instances with a higher load-memory ratio are more useful.

B. Load Shifting

Figure 5:
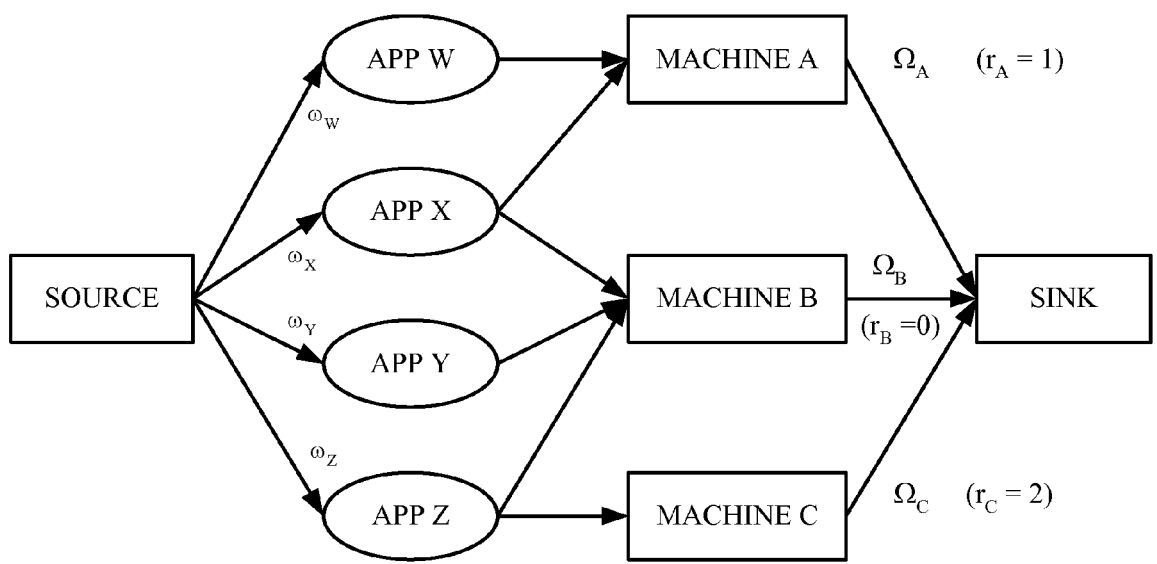
FIG. 5 illustrates a max-flow problem for use in solving an application placement problem, according to an embodiment of the invention.

Solving the max-flow problem in FIG. 5 gives the maximum total demand w that can be satisfied by the current placement matrix I. Among many possible load distribution matrices L that can meet this maximum demand w, we employ several load-shifting heuristics to find the one that makes later placement changes easier.

We classify the running instances of an application into three categories: idle, underutilized, and fully utilized. The idle instances are preferred candidates to be shut down. We opt for leaving the fully utilized instances intact.

Through proper load shifting, we can ensure that every application has at most one underutilized instance in the entire system. Reducing the number of underutilized instances simplifies the placement problem, because the heuristics to handle idle instances and fully utilized instances are straightforward. The issue of load balancing will be addressed separately in a later stage of the algorithm.

We strive to co-locate the residual memory and the residual CPU on the same machines so that the residual resources can be used to start new application instances. For example, if one machine has only residual CPU and another machine has only residual memory, neither of them can accept new applications.

We strive to make idle application instances appear on the machines with more residual memory. By shutting down the idle instances, more memory will become available for hosting applications with a high memory requirement.

C. Placement Changing

The load_shifting( ) subroutine prepares the load distribution in a way that makes later placement changes easier. The placement_changing( ) subroutine further employs several heuristics to increase the total satisfied application demand, to reduce placement changes, and to reduce computation time.

The algorithm walks through the underutilized machines sequentially and makes placement changes to them one by one in an isolated fashion. When working on a machine n, the algorithm is only concerned with the state of machine n and the residual application demands. The states of other machines do not directly affect the current decision to be made for machine n. Moreover, once the applications to run on machine n are decided, later placement changes on other machines will not affect the decision already made for machine n. This isolation of machines dramatically reduces the complexity of the algorithm.

The isolation of machines, however, may lead to inferior placement solutions. We address this problem by alternately executing the load-shifting subroutine and the placement-changing subroutine for multiple rounds. As a result, the residual application demands released from the application instances stopped in the previous round now have the opportunity to be allocated to other machines in the later rounds.

When sequentially walking through the underutilized machines, the algorithm considers machines with a relatively high CPU-memory ratio first. Because it is harder to fully utilize these machines' CPU, we prefer to process them first when we still have abundant options.

When considering the applications to run on a machine, the algorithm tries to find a combination of applications that lead to the highest CPU utilization of this machine. It prefers to stop the running application instances with a relatively low load-memory ratio in order to accommodate new application instances.

To reduce placement changes, the algorithm does not allow stopping application instances that already deliver a sufficiently high load. We refer to these instances as pinned instances. The intuition is that, even if we stop these instances on their hosting machines, it is likely that we will start instances of the same applications on other machines. The algorithm dynamically computes the pinning threshold for each application.

D. Load-Shifting Subroutine

Given the current application demands, the placement algorithm solves a max-flow problem to derive the maximum total demand that can be satisfied by the current placement matrix I. FIG. 5 is an example of this max-flow problem, in which we consider four applications (w, x, y, and z) and three machines (A, B, and C). Each application is represented as a node in the graph. Each machine is also represented as a node. In addition, there are a source node and a sink node. The source node has an outgoing link to each application m, and the capacity of the link is the CPU demand of the application ($\omega_m$). Each machine n has an outgoing link to the sink node, and the capacity of the link is the CPU capacity of the machine ($\Omega_n$). The last set of links are between the applications and the machines that currently run those applications. The capacity of these links is unlimited. In FIG. 5, application x currently runs on machines A and B. Therefore, x has two outgoing links: x→A and x→B.

When the load distribution problem is formulated as this max-flow problem, the maximum volume of flows going from the source node to the sink node is the maximum total demand w that can be satisfied by the current placement matrix I. Efficient algorithms to solve max-flow problems are well known (see, e.g., R. K. Ahuja, T. L. Magnanti, and J. B. Orlin, editors, "Network Flows: Theory, Algorithms, and Applications," Prentice Hall, New Jersey, 1993, ISBN 1000499012). If w equals to the total application demand, no placement changes are needed. Otherwise, some placement changes are made in order to satisfy more demands. Before doing so, the load distribution matrix L produced by solving the max-flow problem in FIG. 5 is first adjusted. A goal of this load shifting process is to achieve the effects described above, for example, co-locating the residual CPU and the residual memory on the machines.

The task of load shifting is accomplished by solving the min-cost max-flow problem in FIG. 5. We sort all the machines in increasing order of residual memory capacity $\Gamma^*_n$, and associate each machine n with a rank $r_n$ that reflects its position in this sorted list. The machine with rank 0 has the smallest residual memory. In FIG. 5, the link between a machine n and the sink node is associated with the cost $r_n$. The cost of all the other links is zero, which is not shown in the figure for brevity. In this example, machine C has more residual memory than machine A, and machine A has more residual memory that machine B. Therefore, the links between the machines and the sink node have costs $r_B=0$, $r_A=1$, and $r_C=2$ respectively.

The load distribution matrix L produced by solving the min-cost max-flow problem in FIG. 5 has the following properties: (1) an application has at most one underutilized instance in the entire system; (2) the residual memory and the residual CPU are likely to co-locate on the same machines; and (3) the idle application instances appear on the machines with relatively more residual memory. That is, in the load distribution matrix L produced by solving the min-cost max-flow problem in FIG. 5, an application has at most one underutilized instance in the entire system. Furthermore, in the load distribution matrix L produced by solving the min-cost max-flow problem in FIG. 5, if application m has one underutilized instance running on machine n, then (1) application m's idle instances must run on machines whose residual memory is larger than or equal to that of machine n; and (2) application m's fully utilized instances must run on machines whose residual memory is smaller than or equal to that of machine n. It is to be appreciated that these properties make later placement changes easier.

E. Placement-Changing Subroutine

The placement-changing subroutine takes as input the current placement matrix I, the load distribution matrix L generated by the load-shifting subroutine, and the residual application demands not satisfied by L. It tries to increase the total satisfied application demand by making some placement changes, for instance, stopping idle application instances and starting useful ones. Again, note that the "placement changes" in the algorithm description are all hypothetical.

As shown in FIG. 4, the main structure of the placement-changing subroutine includes three nested loops. The outermost loop iterates over the machines and asks the intermediate loop to generate a placement solution for one machine n at a time. Suppose machine n currently runs c not-pinned application instances ($M_1, M_2, \ldots, M_c$) sorted in increasing order of load-memory ratio. The intermediate loop iterates over a variable j ($0 \leq j \leq c$). In iteration j, it stops on machine n the j applications ($M_1, M_2, \ldots, M_j$) while keeping the other running applications intact, and then asks the innermost loop to find appropriate applications to consume machine n's residual resources. The innermost loop walks through the residual applications, and identifies those that can fit on machine n. As the intermediate loop varies the number of stopped applications from 0 to c, it collects c+1 different placement solutions for machine n, among which it picks the best one as the final solution.

In the rest of this subsection, we describe the three nested loops in more detail.

The Outermost Loop. Before entering the outermost loop, the algorithm first computes the residual CPU demand of each application. We refer to the applications with a positive residual CPU demand (i.e., $w^*_n > 0$) as residual applications. The algorithm inserts all the residual application into a right-threaded AVL (Adelson-Velsky Landis) tree called residual_app_tree. The applications in the tree are sorted in decreasing order of residual demand. As the algorithm progresses, the residual demand of applications may change, and the tree is updated accordingly. The algorithm also keeps track of the minimum memory requirement $\gamma_{min}$ of applications in the tree, $$\gamma_{min} = \min_{m \in residual\_app\_tree} \gamma_m, \quad (12)$$

where $\gamma_m$ is the memory needed to run one instance of application m. The algorithm uses $\gamma_m$ to speedup the computation in the innermost loop. If a machine n's residual memory is smaller than $\gamma_{min}$ (i.e., $\Gamma^*_n < \gamma_{min}$), the algorithm can immediately infer that this machine cannot accept any applications in the residual_app_tree.

The algorithm excludes fully utilized machines from the consideration of placement changes, and sorts the underutilized machines in decreasing order of CPU-memory ratio. Starting from the machine with the highest CPU-memory ratio, it enumerates each underutilized machine, and asks the intermediate loop to compute a placement solution for the machine. Because it is harder to fully utilize the CPU of machines with a high CPU-memory ratio, we prefer to process them first when we still have abundant options.

The Intermediate Loop. Taking as input the residual_app_tree and a machine n given by the outermost loop, the intermediate loop computes a placement solution for machine n. Suppose machine n currently runs c not-pinned application instances. Application instance pinning is described below. We can stop a subset of the c applications, and use the residual resources to run other applications. In total, there are $2^c$ cases to consider. We use a heuristic to reduce this number to c+1. Intuitively, we prefer to stop the less "useful" application instances, i.e., those with a low load-memory ratio ($L_{m,n}/\gamma_m$).

The algorithm first sorts the not-pinned application instances on machine n in increasing order of load-memory ratio. Let ($M_1, M_2, \ldots, M_c$) denote this sorted list. The intermediate loop iterates over a variable j ($0 \leq j \leq c$). In iteration j, it stops on machine n the j applications ($M_1, M_2, \ldots, M_j$) while keeping the other running applications intact, and then asks the innermost loop to find appropriate applications to consume machine n's residual resources that become available after stopping the j applications. As the intermediate loop varies the number of stopped applications from 0 to c, it collects c+1 placement solutions, among which it picks as the final solution the one that leads to the highest CPU utilization of machine n.

We illustrate this through an example. Suppose machine n currently runs three not-pinned application instances ($M_1$, $M_2$, $M_3$) sorted in increasing order of load-memory ratio. Intuitively, $M_3$ is more useful than $M_2$, and $M_2$ is more useful than $M_1$. The algorithm tries four placement solutions. In solution 1, it stops none of $M_1$, $M_2$, and $M_3$. In solution 2, it stops $M_1$ but keeps $M_2$ and $M_3$. In solution 3, it stops $M_1$ and $M_2$, but keeps $M_3$. In solution 4, it stops $M_0$, $M_1$, and $M_2$. For each solution, the innermost loop finds appropriate applications to consume machine n's residual resources that become available after stopping the applications. Among the four solutions, the algorithm picks the best one as the final solution.

The Innermost Loop. The intermediate loop changes the number of applications to stop. The innermost loop uses machine n's residual resources to run some residual applications. Recall that the residual_app_tree is sorted in decreasing order of residual CPU demand. The innermost loop iterates over the residual applications, starting from the one with the largest residual demand. When an application m is under consideration, it checks two conditions: (1) if the restriction matrix R allows application m to run on machine n, and (2) if machine n has sufficient residual memory to host application m, (i.e., $\gamma_m \leq \Gamma^*_n$). If both conditions are satisfied, it places application m on machine n, and assigns as much load as possible to this instance until either machine n's CPU is fully utilized or application m has no residual demand. After this allocation, application m's residual demand changes, and the residual_app_tree is updated accordingly.

The algorithm loops over the residual applications until either: (1) all the residual applications have been considered once; or (2) machine n's CPU becomes fully utilized; or (3) machine n's residual memory is insufficient to host any residual application (i.e., $\Gamma^*_n < \gamma_{min}$, see Equation 12). Typically, after hosting a few residual applications, machine n's residual memory quickly becomes too small to host more residual applications. Therefore, the third condition helps reduce computation time.

F. Full Placement Algorithm

While the placement algorithm is outlined in FIG. 4, a full placement algorithm is illustrated in detail in FIGS. 6A through 8. Namely, FIGS. 6A and 6B illustrates pseudo code for the place function, FIGS. 7A and 7B illustrates pseudo code for the placement changing function, and FIG. 8 illustrates pseudo code for the load shifting function.

The placement algorithm incrementally optimizes the placement solution in multiple rounds. In one round, it first invokes the load-shifting subroutine and then invokes the placement-changing subroutine. It repeats for up to K rounds, but quits earlier it sees no improvement in the total satisfied application demand after one round of execution. The last step of the algorithm balances the load across machines. By way of example only, we use the load-balancing component from an exiting algorithm (A. Karve, T. Kimbrel, G. Pacifici, M. Spreitzer, M. Steinder, M. Sviridenko, and A. Tantawi, "Dynamic Application Placement for Clustered Web Applications," In the International World Wide Web Conference (WWW), May 2006). However, other existing load balancing techniques can be employed. Intuitively, when the algorithm has choices, it moves the new application instances (started by the placement-changing subroutine) among machines to balance the load, while keeping the total satisfied demand and the number of placement changes the same.

The placement algorithm deals with multiple optimization objectives. In addition to maximizing the total satisfied demand, it also strives to minimize placement changes, because they disturb the running system and waste CPU cycles. In practice, many J2EE applications take a few minutes to start or stop, and take some additional time to warm up their data cache. The heuristic for reducing unnecessary placement changes is not to stop application instances whose load (in the load distribution matrix L) is above certain threshold. We refer to them as pinned instances. The intuition is that, even if we stop these instances on their hosting machines, it is likely that we will start instances of the same applications on other machines.

Each application m has its own pinning threshold $w_m^{pin}$. If the value of the threshold is too low, the algorithm may introduce many unnecessary placement changes. If it is too high, the total satisfied demand may be low due to insufficient placement changes. The algorithm computes the pinning thresholds for all the applications from the information gathered in a single dry-run invocation to the placement-changing subroutine. The dry run pins no application instances. After the dry run, the algorithm makes a second invocation to the placement-changing subroutine, and requires pinning the application instances whose load is higher than or equal to the pinning threshold of the corresponding application, i.e., $L_{m,n} \geq w_m^{pin}$. The dry run and the second invocation use exactly the same inputs: the matrices I and L produced by the load-shifting subroutine. Between the two placement solutions produced by the dry run and the second invocation, the algorithm picks as the final solution the one that has a higher total satisfied demand. If the total satisfied demands are equal (e.g., both solutions satisfy all the demands), it picks the one that has less placement changes.

Next, we describe how to compute the pinning threshold $w_m^{pin}$ for each application m from the information gathered in the dry run. Intuitively, if the dry run starts a new application instance, then we should not stop any instance of the same application whose load is higher than or equal to that of the new instance. This is because the new instance's load is considered sufficiently high by the dry run so that it is even worthwhile to start a new instance. Let $w_m^{new}$ denote the minimum load assigned to a new instance of application m in the dry run.

$$w_m^{new} = \min\{L_{m,n} \text{ after the dry run}\} \quad I_{m,n} \in \{\text{new instances of app } m \text{ started in the dry run}\} \quad (13)$$

Here $I_{m,n}$ represents a new instance of application m started on machine n in the dry run. $L_{m,n}$ is the load of this instance.

In addition, the pinning threshold also depends the largest residual demand $w^*_{max}$ not satisfied in the dry run.

$$w^*_{max} = \max_{m \in \{residual\_app\_tree\_after\_dry\_run\}} w^*_m \qquad (14)$$

Here $w^*_m$ is the residual demand of application m after the dry run. We should not stop the application instances whose load is higher than or equal to $w^*_{max}$. If we stop these instances, they will immediately become the applications that we try to find a place to run. The pinning threshold for application m is computed as follows.

$$w_m^{pin} = \max(1, \min(w^*_{max}, w_m^{new})) \qquad (15)$$

Because we do not want to pin completely idle application instances, Equation 15 stipulates that the pinning threshold $w_m^{pin}$ should be at least one CPU cycle per second.

It is to be appreciated that most of the computation time of the placement algorithm is spent on solving the max-flow problem and the min-cost max-flow problem in FIG. 5. One example of an efficient algorithm for solving the max-flow problem is the highest-label preflow-push algorithm (R. K. Ahuja, T. L. Magnanti, and J. B. Orlin, editors, "Network Flows: Theory, Algorithms, and Applications," Prentice Hall, New Jersey, 1993, ISBN 1000499012), whose complexity is $O(s^2\sqrt{t})$ where s is the number of nodes in the graph, and t is the number of edges in the graph. One example of an efficient algorithm for solving the min-cost flow problem is the enhanced capacity scaling algorithm (also see R. K. Ahuja, T. L. Magnanti, and J. B. Orlin, editors, "Network Flows: Theory, Algorithms, and Applications," Prentice Hall, New Jersey, 1993, ISBN 1000499012), whose complexity is $O((s \log t)(s+t \log t))$. Let N denote the number of machines, and M denote the number of applications. Due to the high memory requirement of J2EE applications, we assume that the number of applications that a machine can run is bounded by a constant. Therefore, in the network flow graph, both the number s of nodes and the number t of edges are bounded by O(N). The total number of application instances in the entire system is also bounded by O(N). Under these assumptions, the complexity of the placement algorithm is $O(N^{2.5})$.

Figure 9:
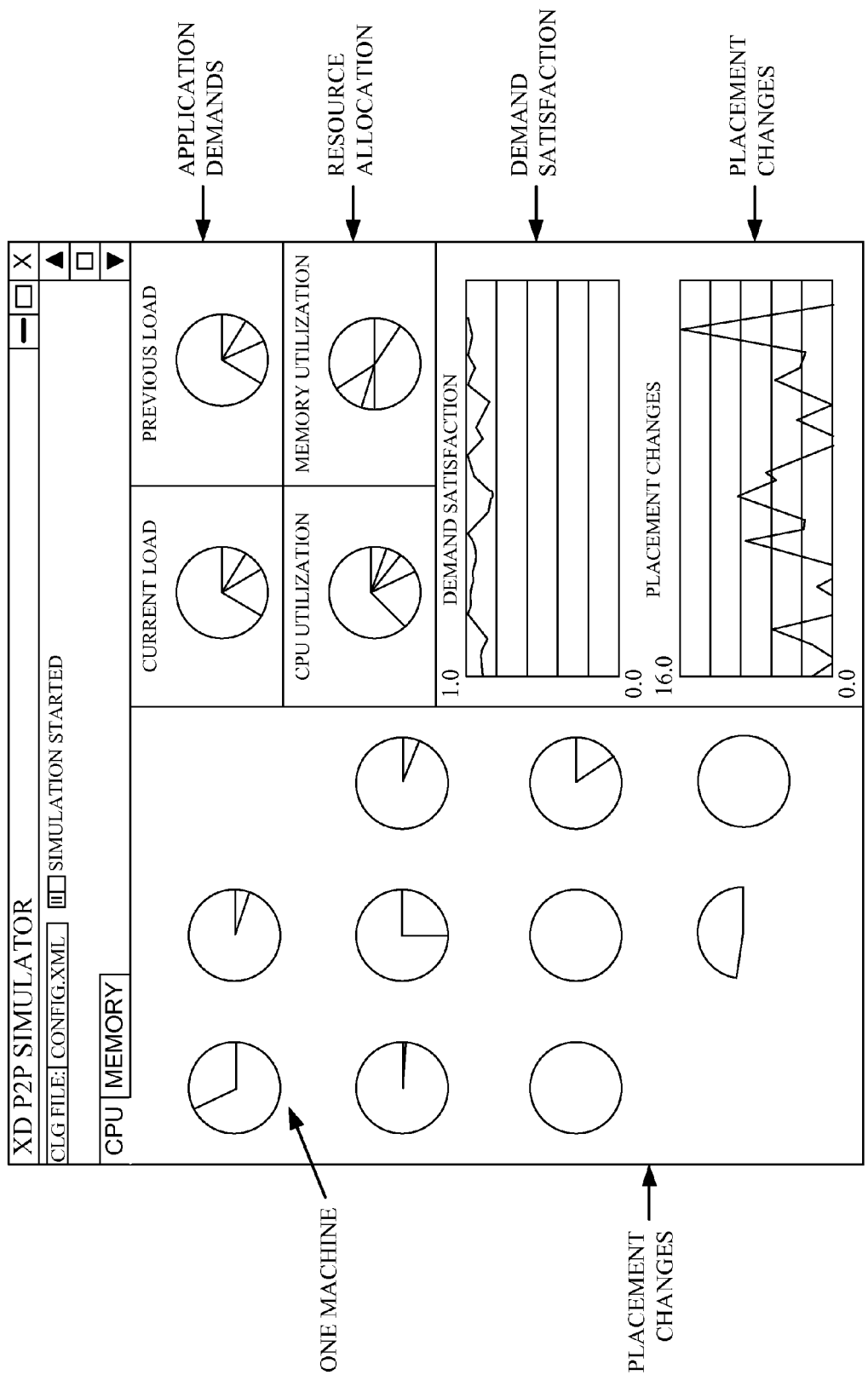
FIG. 9 illustrates a graphical user interface for use with an application placement algorithm, according to an embodiment of the invention.

FIG. 9 illustrates a graphical user interface that may be used to visualize the real-time behavior of the placement algorithm executed by placement controller 202 (FIG. 2).

Figure 10:
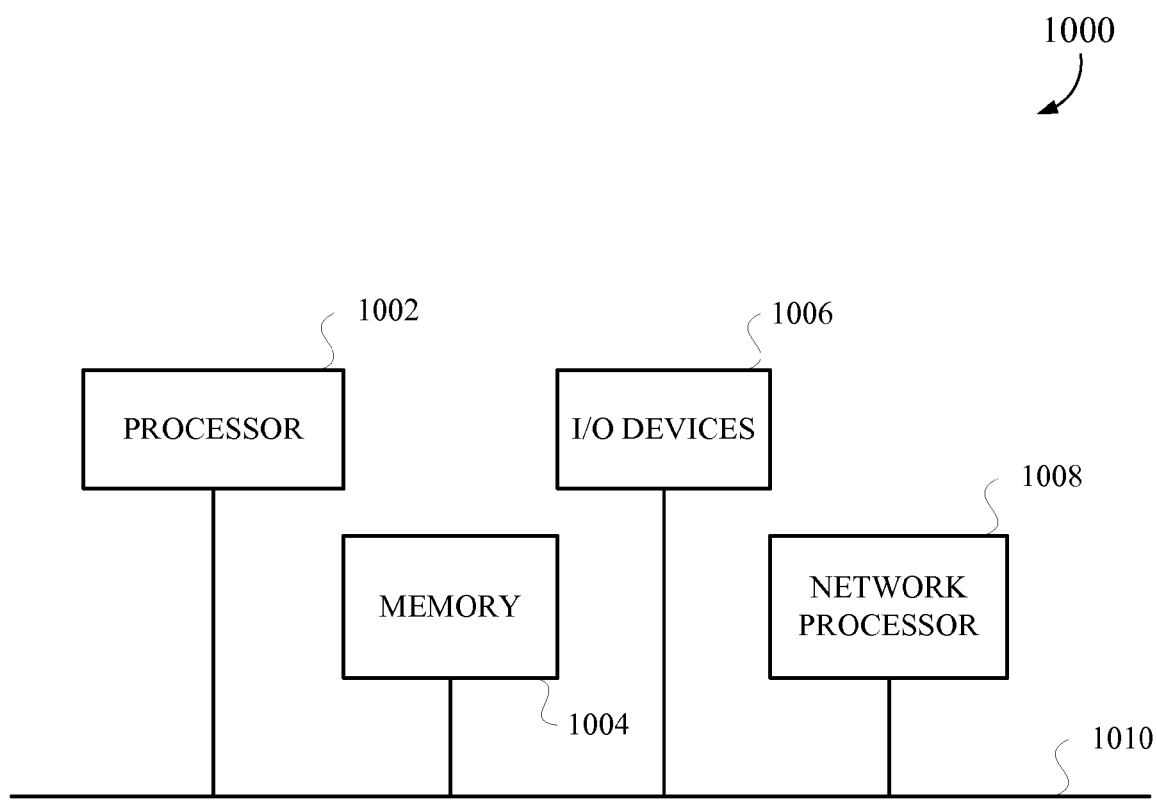
FIG. 10 illustrates a computing system for implementing an application placement algorithm, according to an embodiment of the invention.

FIG. 10 illustrates a computing system in accordance with which one or more components/steps of the application placement system (e.g., components and methodologies described in the context of FIGS. 2 through 9) may be implemented, according to an embodiment of the present invention. It is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

Thus, the computing system shown in FIG. 10 may represent an illustrative architecture for a computing system associated with placement controller 202 (FIG. 2). For example, the computing system in FIG. 10 may be the computing system that performs the algorithm functions illustrated in the context of FIGS. 4-8 (as well as any applicable steps discussed in the context of such figures). Also, the computing system in FIG. 10 may represent the computing architecture for each of the machines (servers) upon which application instances are placed. Still further, placement sensor 205, application demand estimator 206, configuration database 207, and placement executor 209, may be implemented on one or more such computing systems.

As shown, computing system 1000 may be implemented in accordance with a processor 1002, a memory 1004, I/O devices 1006, and a network interface 1008, coupled via a computer bus 1010 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit. The graphical user interface of FIG. 9 may be implemented in accordance with such an output device.

Still further, the phrase "network interface" as used herein is intended to include, for example, one or more transceivers to permit the computing system of FIG. 10 to communicate with another computing system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Accordingly, illustrative principles of the invention provide many advantages over existing approaches, for example:

The placement algorithm is an online algorithm that, under multiple resource constraints, can efficiently produce high-quality solutions for hard placement problems with thousands of machines and thousands of applications. By "online," it is meant that the algorithm has to solve the placement problem in a short period of time, (e.g., seconds or minutes) because the other computers are waiting for the decision in real time. By contrast, "offline" means that, we can run the algorithm for hours, days, or even months to solve the problem. That is, nobody is waiting for the result right away. This scalability is crucial for dynamic resource provisioning in large-scale enterprise data centers.

A load-lifting mechanism that makes later placement changes easier. For example, it co-locates different types of residual resources on the same machines so that they can be used to start new application instances.

A mechanism to reduce the number of application starts and stops by pinning application instances that already deliver a sufficiently high load. The algorithm dynamically computes an appropriate pinning threshold for every application through a dry run of making placement changes.

A mechanism that does placement changes to the machines one by one in an isolated fashion. This strategy dramatically reduces the computation time, and also helps reduce the number of placement changes. We further address the limitations of this isolation of machines through multi-round optimizations.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for new application instance placement in a set of machines under one or more resource constraints, the method comprising the steps of:
   computing an estimate of a value of a first metric associated with a current application instance placement and a current application load distribution; and
   determining the new application instance placement and a new application load distribution that optimizes the first metric, wherein the determining step further comprises:
      the new application instance placement improving upon the first metric and the new application load distribution improving upon a second metric;
      shifting an application load;
      changing the current application instance placement without pinning to determine a first candidate placement;
      changing the current application instance placement with pinning to determine a second candidate placement; and
      selecting a best placement from the first candidate placement and the second candidate placement as the new application instance placement;
   wherein the computing and determining steps are performed at least in part by a processor coupled to a memory.

2. The method of claim 1, wherein the determining step is performed multiple times.

3. The method of claim 1, further comprising the step of balancing an application load across the set of machines.

4. The method of claim 1, wherein the first metric comprises a total number of satisfied demands.

5. The method of claim 1, wherein the first metric comprises a total number of placement changes.

6. The method of claim 1, wherein the first metric comprises an extent to which an application load is balanced across the set of machines.

7. The method of claim 1, wherein one of the one or more resource constraints comprises a processing capacity.

8. The method of claim 1, wherein one of the one or more resource constraints comprises a memory capacity.

9. The method of claim 1, wherein the second metric comprises a degree of correlation between residual resources on each machine of the set of machines.

10. The method of claim 1, wherein the second metric comprises a number of underutilized application instances.

11. Apparatus for new application instance placement in a set of machines under one or more resource constraints, the apparatus comprising:
   a memory; and
   at least one processor coupled to the memory and operative to: (i) compute an estimate of a value of a first metric associated with a current application instance placement and a current application load distribution; and (ii) determine the new application instance placement and a new application load distribution that optimizes the first metric, wherein the determining operation further comprises:
      the new application instance placement improving upon the first metric and the new application load distribution improving upon a second metric;
      shifting an application load;
      changing the current application instance placement without pinning to determine a first candidate placement;
      changing the current application instance placement with pinning to determine a second candidate placement; and
      selecting a best placement from the first candidate placement and the second candidate placement as the new application instance placement.

12. An article of manufacture for new application instance placement in a set of machines under one or more resource constraints, comprising a non-transitory machine readable medium containing one or more programs which when executed implement the steps of:
   computing an estimate of a value of a first metric associated with a current application instance placement and a current application load distribution; and
   determining the new application instance placement and a new application load distribution that optimizes the first metric, wherein the determining step further comprises:
      the new application instance placement improving upon the first metric and the new application load distribution improving upon a second metric
      shifting an application load;
      changing the current application instance placement without pinning to determine a first candidate placement;
      changing the current application instance placement with pinning to determine a second candidate placement; and
      selecting a best placement from the first candidate placement and the second candidate placement as the new application instance placement.

* * * * *